US009760795B2

(12) United States Patent
Lee et al.

(10) Patent No.: US 9,760,795 B2
(45) Date of Patent: Sep. 12, 2017

(54) METHOD AND APPARATUS FOR EXTRACTING IMAGE FEATURE

(71) Applicant: Electronics and Telecommunications Research Institute, Daejeon (KR)

(72) Inventors: Seungjae Lee, Daejeon (KR); Sangil Na, Daejeon (KR); Keun Dong Lee, Daejeon (KR); Sungkwan Je, Daejeon (KR); Da-Un Jung, Daejeon (KR); Weon Geun Oh, Daejeon (KR); Young Ho Suh, Daejeon (KR); Wookho Son, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 672 days.

(21) Appl. No.: 14/265,283

(22) Filed: Apr. 29, 2014

(65) Prior Publication Data
US 2015/0242703 A1    Aug. 27, 2015

(30) Foreign Application Priority Data

Feb. 24, 2014    (KR) .................. 10-2014-0021167

(51) Int. Cl.
  *G06K 9/46*    (2006.01)
  *G06F 17/30*    (2006.01)
(52) U.S. Cl.
  CPC ..... *G06K 9/4671* (2013.01); *G06F 17/30247* (2013.01)

(58) Field of Classification Search
  CPC .......... G06F 17/30247; G06F 17/3028; G06K 9/4671
  See application file for complete search history.

(56) References Cited

U.S. PATENT DOCUMENTS

| | | | |
|---|---|---|---|
| 6,711,293 B1 | 3/2004 | Lowe | |
| 8,477,836 B2 | 7/2013 | Yoon et al. | |
| 2005/0262067 A1 | 11/2005 | Lee et al. | |
| 2010/0169576 A1* | 7/2010 | Chen | G06F 12/0897 711/122 |
| 2010/0303354 A1* | 12/2010 | Reznik | G06K 9/4642 382/168 |
| 2011/0170780 A1* | 7/2011 | Vaddadi | G06K 9/4671 382/190 |
| 2011/0255781 A1* | 10/2011 | Hamsici | G06K 9/4671 382/170 |
| 2011/0299782 A1* | 12/2011 | Hamsici | G06K 9/4671 382/195 |

(Continued)

FOREIGN PATENT DOCUMENTS

| | | | | |
|---|---|---|---|---|
| JP | 2004-213127 | * | 7/2004 | .............. G06T 7/00 |
| JP | 2004-213127 A | | 7/2004 | |
| KR | 10-0319154 B1 | | 12/2001 | |

*Primary Examiner* — Amara Abdi

(57) ABSTRACT

A method for extracting features from an image for use in a computing device, the method comprising: producing Gaussian Scale Space (GSS) images in the type of a pyramid from the image inputted to the computing device; performing a Scale Normalized Laplacian Filtering on the GSS images; detecting interest points from the images that are subject to the Scale Normalized Laplacian Filtering; and extracting features of the image using the detected interest points.

13 Claims, 6 Drawing Sheets

(56) References Cited

U.S. PATENT DOCUMENTS

2012/0301014 A1* 11/2012 Xiao .................... G06K 9/4676
                                                    382/159
2013/0308860 A1* 11/2013 Mainali ................ G06K 9/4671
                                                    382/170

* cited by examiner

METHOD AND APPARATUS FOR EXTRACTING IMAGE FEATURE

RELATED APPLICATIONS

This application is based on and claims priority from Korean Patent Application No. 10-2014-0021167, filed on Feb. 24, 2014, the disclosure of which is incorporated herein in its entirety by reference.

FIELD OF THE INVENTION

The present invention relates to an image feature extraction technology, and more particular, to a method and apparatus for extracting interest points for image local descriptors.

BACKGROUND OF THE INVENTION

With the spread of smartphones and the continuous development of SNSs (Social Network Services), an increasing attention is paid to a variety of image search and augmented reality services using local descriptors on a basis of interest points.

A technology for extracting invariant interest points is a requisite for the provision of the image search and augmented reality services. There has been proposed various techniques for extracting the interest points. Among of them, an interest point detector using DoG (Different of Gaussian) is most commonly used, which may be employed in SIFT (Scale-Invariant Feature Transform) (see, D. Lowe, "Distinctive image features from scale-Invariant key points," Int. J. Comput. Vis, vol 60, no 2, pp 91.110, 2004). The DoG uses difference image using Gaussian image as an approximation value of the LoG (Laplacian of Gaussian), which has an advantage in terms of an amount of computation.

However, the interest point detector has disadvantages in that it not only requires an additional storage space for Gaussian images and difference images, but also has no choice to use an approximation of the LoG.

SUMMARY OF THE INVENTION

In view of the above, the present invention provides a method and apparatus for normalizing image scales in consideration of the response characteristic based on LoG (Laplacian of Gaussian) used for extracting interest points and the image features.

Further, the present invention provides a method and apparatus for extracting image features capable of improving the detection efficiency of interest points and the image features with the help of an efficient allocation of storage area for the images.

In accordance with an embodiment of the present invention, there is provided a method for extracting features from an image for use in a computing device, which includes: producing Gaussian Scale Space (GSS) images in the type of a pyramid from the image inputted to the computing device; performing a Scale Normalized Laplacian Filtering on the GSS images; detecting interest points from the images that are subject to the Scale Normalized Laplacian Filtering; and extracting features of the image using the detected interest points.

In the embodiment, said detecting interest points comprises: storing adjacent first, second and third GSS images among the GSS images in a first storage space; copying the second GSS image and the third GSS image into a second storage space; producing first, second and third SCLOG (Scale Normalized Laplacian of Gaussian) images corresponding to the first, second and third GSS images; storing the second SCLoG image among the SCLoG images in the second storage space; and calculating a first gradient from the second GSS image in the second storage space to store in the first storage space.

In the embodiment, the first gradient comprises a magnitude gradient and an orientation gradient calculated from the second GSS image.

In the embodiment, said detecting interest points comprises: storing the second GSS image and the third GSS image in the first storage space; producing a fourth GSS image from the third GSS image to store in the second storage space; producing a fourth SCLog image from the fourth GSS image to store in the first storage space; calculating a second gradient from the three GSS image in the second storage space to store in the first storage space.

In the embodiment, the second gradient comprises a magnitude gradient and an orientation gradient calculated from the third GSS image.

In the embodiment, said producing a fourth GSS image from the third GSS image comprises applying a Gaussian Smoothing to the third GSS image.

In accordance with an embodiment of the present invention, there is provided an apparatus for extracting features from an image for use in a computing device, which includes: means for producing Gaussian Scale Space (GSS) images in the type of a pyramid from the image inputted to the computing device; means for performing a Scale Normalized Laplacian Filtering on the GSS images; means for detecting interest points from the images that are subjected to the Scale Normalized Laplacian Filtering; and means for extracting features of the image using the detected interest points.

In the embodiment, the means for detecting interest points is configured to: store adjacent first, second and third GSS images among the GSS images in a first storage space; copy the second GSS image and the third GSS image into a second storage space; produce first, second and third SCLOG (Scale Normalized Laplacian of Gaussian) images corresponding to the first, second and third GSS images; store the second SCLoG image among the SCLoG images in the second storage space; and calculate a first gradient from the second GSS in the second storage space to store in the first storage space.

In the embodiment, the first gradient comprises a magnitude gradient and an orientation gradient calculated from the second GSS image.

In the embodiment, the means for detecting interest points is further configured to: store the second GSS image and the third GSS image in the first storage space; produce a fourth GSS image from the third GSS image to store in the second storage space; produce a fourth SCLog image from the fourth GSS image to store the first storage space; calculate a second gradient from the three GSS image in the second storage space to store in the first storage space.

In the embodiment, the second gradient comprises a magnitude gradient and an orientation gradient calculated from the third GSS image.

In the embodiment, the fourth GSS image is produced by applying a Gaussian Smoothing to the third GSS image.

Accordingly, the configuration of one or more embodiments of the present invention may be employed to select interest points while utilizing the response characteristic of the LoG. Further, by help of the configuration, it is possible to reduce the usage of memory in a computing device including the image feature extracting apparatus, such as smartphones, smart pads, smart glasses, smart clocks, laptop computers, desktop computers, and the like.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
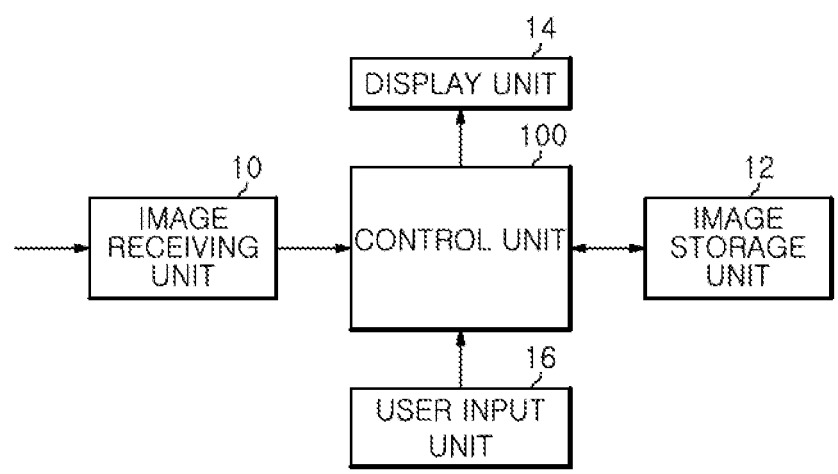
FIG. 1 shows a schematic block diagram of an apparatus for extracting image features in accordance with an embodiment of the present invention.

The advantages and features of embodiments and methods of accomplishing these will be clearly understood from the following described embodiments taken in conjunction with the accompanying drawings. However, embodiments are not limited to those embodiments and may be implemented in various forms. It is noted that the present embodiments are provided to make a full disclosure and also to allow those skilled in the art to know the full range of the embodiments. Therefore, embodiments are to be defined only by the scope of the appended claims. Further, like reference numerals refer to like elements throughout the specification.

In the following description, well-known functions or constitutions will not be described in detail if they would obscure the invention in unnecessary detail. Further, the terminologies to be described below are defined in consideration of functions in the invention and may vary depending on a user's or operator's intention or practice. Accordingly, the definition may be made on a basis of the content throughout the specification.

Before describing one or more embodiments of the present invention, it is noted that the embodiments of present invention provides a method and apparatus for detecting interest points and extraction features of an image that normalizes image scales in consideration of response characteristic of LoG (Laplacian of Gaussian) in order for detecting the interest points and extraction the features of the image and efficiently allocates storage spaces, whereby the subject matter of the present invention can be achieved easily from the technical idea.

Hereinafter, one or more exemplary embodiments of the present invention will be described in detail with reference to the accompanying drawings.

FIG. 1 illustrates a block diagram of an apparatus for extracting image features in accordance with an exemplary embodiment of the present invention. The image feature extraction apparatus includes an image receiving unit 10, an image storage unit 12, a display unit 14, a user input unit 16, and a control unit 100. It will be appreciated to those skilled in the art that the image feature extraction apparatus may be applied to, for example, a computing device such as smartphones, smart pads, smart glasses, smart clocks, laptop computers, desktop computers, and the like.

As illustrated in FIG. 1, the mage receiving unit 10 is responsible for receiving an image captured by cameras (not shown) and transferring the image to the control unit 100. The image storage unit 12 includes a storage space for storing the image received from the image receiving unit the image receiving unit 10. The images are stored in a given storage space under the control of the control unit 100.

The display unit 14, which may be implemented by LEDs, OLEDs, etc., serves to process any images so as to output to the exterior.

The user input unit 16 may include a keypad, a touch pad, etc., which plays role to produce user input signals for image processing or control operations and provides them to the control unit 100.

The display unit 14 and the user input unit 16 may be configured in separate components or may be integrated in one body in the image feature extraction apparatus, if necessary.

The control unit 100 applicable of the exemplary embodiments controls the overall components in the image feature extraction apparatus. Specifically, the control unit 100 normalizes image scales in consideration of response characteristic based on LoG and detects interest points of the normalized image scale, in which three adjacent images in a Gaussian Scale Space (hereinafter, referred to as a GSS) are employed in a computation process for allocating storage spaces. The detailed description on the control unit 100 will be discussed with reference to FIGS. 2 to 6 later.

Figure 2:
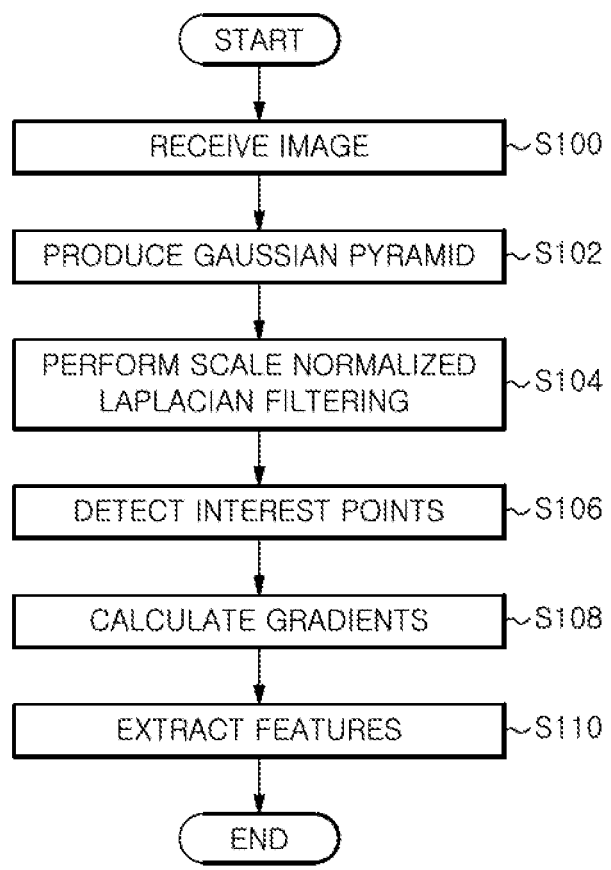
FIG. 2 illustrates a flow diagram of a method of extracting image features in accordance with an embodiment of the present invention.

The exemplary embodiment of the present invention may extract the interest points and features of the image through the process as shown in FIG. 2, which configures images of a Gaussian pyramid for each octave with respect to the image.

First, a Gaussian filter is applied to an input image while increasing the value of sigma ($\sigma$). Whenever the value sigma ($\sigma$) becomes doubled, the image is subject to a down-sampling and then the foregoing process is repeated.

Octave may be varied depending on the size of the image. The change in the octave results in reducing the size of width×height of the images by ¼. The number of Gaussian images in one octave is put in 's(scale)+3', where 's' is an arbitrary integer constant. When the number of Gaussian images becomes the number of 's+3', Difference of Gaussian image (DoG) is the number of 's+2'. In practice, since local extrema cannot be calculated from the images of the beginning and end in the DoG, the number of the images used to calculate the local extrema becomes the number of 's'. For example, it is assumed that there are three scales. Then, a Gaussian image and '3+2' DoG images are required since a previous scale and a following scale are required in order to detect the interest points. In addition, a difference for the five DoG images is needed. As a result, a total of six Gaussian images are required for the purpose of detecting the interest points. The exemplary embodiment of the present invention is characterized in that it extracts the interest points by using a scale-normalized Laplacian filtering in lieu of difference images.

Hereinafter, the exemplary embodiment of the present invention will be described with reference to FIG. 2.

As illustrated in FIG. 2, when an image is received through the mage receiving unit 10 (Block S100), the control unit 100 produces GSS images in a Gaussian pyramid for each octave from the input image (Block S102). In other words, the control unit 100 produces Gaussian images (or GSS images) in the form of a pyramid on a basis of each preset scale corresponding to a current octave from the input image.

Nest, the control unit 100 applies the Scale Normalized Laplacian Filtering to the GSS images (Block S104). More specifically, when utilizing LoG, it is necessary a proper scale value to compensate a response of the LoG with the increase in a value of σ of the Gaussian. Therefore, the scale value is defined and the GSS images are then subject to the Scale Normalized Laplacian Filtering to produce a Scale Normalized LoG (hereinafter, referred to as SCLoG) images. The process of the Scale Normalized Laplacian Filtering will be discussed with reference to FIGS. 3 to 6 later.

Accordingly, the interest points are detected through use of the Scale Normalized Laplacian Filtering (Block S106). That is, the control unit 100 can detect the interest points of neighboring extrema in the image by using LoG response.

Thereafter, the control unit 100 performs a gradient calculation on the SCLoG images to obtain gradient response, for example, magnitude and orientation from the SCLoG images (Block S108).

Further, in Block S110, the control unit 100 extracts features from the interest points detected in Block 5106. In this regard, it is possible to extract a variety of features on the basis of dedicated algorithms. In the exemplary embodiment, for example, the extracted features may be SIFT (Scale-Invariant Feature Transform) descriptors.

Meanwhile, an existing DoG extracts interest points using an approximate expression of LoG such as the following Equation 1, instead of a Laplacian filtering, after performing the operation of Block S102 to produce the Gaussian pyramid.

$$D_{\sigma,k}(x)=G_\sigma(x)-D_{k\sigma}(x)\approx-(k-1)\sigma^2\nabla^2 G \quad \text{[EQUATION 1]}$$

However, the exemplary embodiment of the present invention is characterized in that it extracts the interest points by using the LoG response, instead of the approximate expression. It may also be preferable to take an appropriate compensation to prevent the response of the LoG being reduced owing to the value of σ. In addition, for an efficient interest point extraction using a local descriptor, it may be needed to select the interest points based on the characteristic of the interest points as disclosed in a paper, e.g., Gianluca Francini, Skjalg Lepsey, and Massimo Balestri, "Selection of local features for visual search," Signal Processing-Image Communication, 2012.

The selection of the interest points is the process of selecting features useful for the detection of an image from a plurality of interest points under a restricted environment (e.g., networks, memories, etc.) and uses the value of σ including several factors of the interest points, for example, scale, orientation, peak, etc. In this case, the use of the LoG needs to the compensation of the value of σ, which may influence the selection of the interest points.

The following TABLE 1 represents the correlation between the peaks and scales that are key factors in selecting the interest points, which demonstrates that the effectiveness of the parameters for selecting the interest points is reduced when the correlation becomes high.

TABLE

|  | DoG | LoG (considering scale only) | LoG (considering octave and scale) |
|---|---|---|---|
| correlation between peaks and scales | 0.1484 | 0.1597 | 0.7215 |

It can be seen from TABLE that considering only the scale is more efficient than anything else in order to compensate for the value of σ. In actual, a consideration should be given to the value corresponding to the sigma value influenced by the octave, but in that case, the correlation between the scale values and the peak values, which are the key factors in selecting the interest points, is large, which makes it difficult to efficiently select the interest points.

In order to solve these problems, the embodiment of the present invention is characterized in that it considers only the scale, rather than compensating the sigma value.

In general, the extraction of Scale-Invariant interest points requires building a Gaussian scale space and generating GSS images based on the octaves and scales. The octaves and scales may vary depending on the implementation methods, the process of detecting the interest points, in general, is done per octave.

An exemplary embodiment of the present invention considers only the scale, in detecting the interest points, without considering the sigma. Therefore, the exemplary embodiment proposes a method of allocating an efficient storage space in detecting the interest point for each octave.

Figure 3:
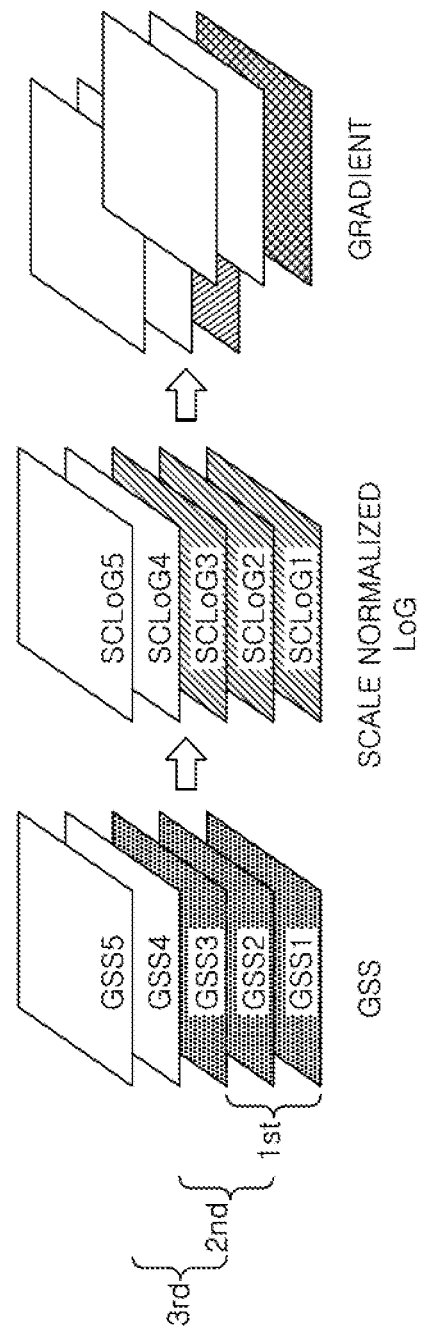
FIG. 3 illustrates a process of detecting interest points for extracting image features in accordance with an exemplary embodiment of the present invention.

FIG. 3 illustrates a process for performing LoG on five GSS images and detecting interest points and extracting features from three adjacent GSS images, under the assumption that five GSS images are present.

Figure 4:
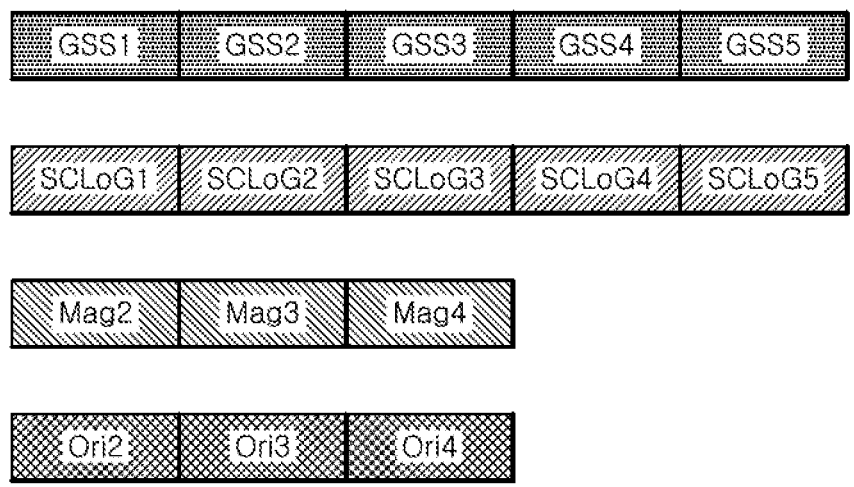
FIG. 4 depicts an assignment of storage areas in a method for extracting image features of a prior art.

For an existing DoG, six GSS images are employed to obtain the response of the LoG, which requires additional storage areas. To be more specific, if setting up the storage areas for each image, it is required a total of 16 storage areas: five storage areas GSS1 to GSS5 for five GSS images; five storage areas SCLoG1 to SCLoG5 for five SCLoG images; three storage areas Mag2 to Mag4 for three magnitude gradients; and three storage areas Ori2 to Ori4 for three orientation gradients, as illustrated in FIG. 4. This entails the need of additional storage areas for the feature extraction, which results in increasing the price of the computing device.

Figure 5:
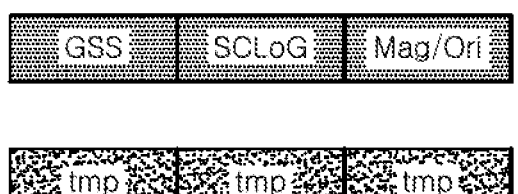
FIG. 5 depicts an example of allocation of storage space in a method for extracting image features in accordance with an exemplary embodiment of the present invention.

To remove the aforementioned issue, the exemplary embodiment of the present invention proposes a process of calculating the interest points and features using only six storage areas, as illustrated in FIG. 5. More specifically, the calculation requires one storage area SCLoG for a SCLoG image, one storage area GSS for a GSS image, and one storage area Mag/Ori for magnitude/orientation gradients. In addition, three temporary storage areas, tmp, are used for a process of copying and calculating the GSS images and SCLoG images. In the following description, it is to be called that the upper storage areas in FIG. 5 is a first storage space and the lower storage areas in FIG. 5 is a second storage space, wherein the gradients such as magnitude and orientation gradients are stored in these storage spaces through the copy and calculation of the GSS and SCLoG images.

For the detection of interest points and the feature extraction using six storage areas, only three adjacent GSS images, for example, GSS1, GSS2, and GSS3, are employed, and the GSS and SCLoG images are produced through a process of copying and calculating them into temporary storage areas, tmp.

Figure 6:
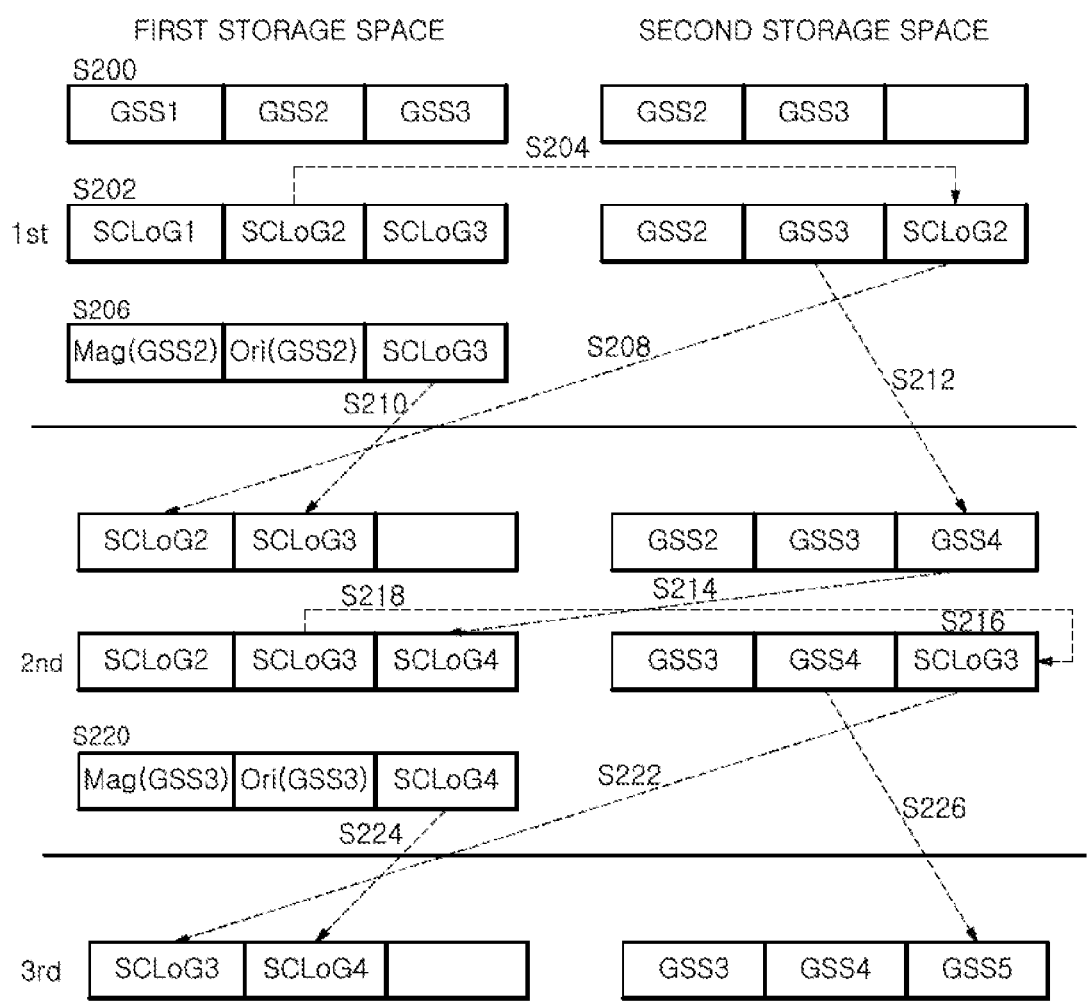
FIG. 6 shows a process of detecting interest points performed in a method for extracting image features in accordance with an exemplary embodiment of the present invention.

It will be described the process of copying and calculating the images into the first storage space and the second storage space with reference to FIG. 6 in detail, First, the images, i.e., GSS1, GSS2 and GSS3 images are copied into the first storage space in order and then the GSS2 image and GSS3 image are copied into a first area and a second area, respectively, of the second storage space (Block S200).

Thereafter, the GSS1 to GSS3 images are passed through a Laplacian filter to calculate SCLoG1 to SCLoG3 image by compensating them by scales (Block S202).

The calculated SCLoG2 image is temporarily copied into a blank area (i.e., a third area) of the second storage space (Block S204).

Subsequently, the interest points are detected from the GSS image in the first storage space, a magnitude gradient Mag(GSS2) and orientation gradient Ori(GSS2) are calculated from the GSS2 image in the first area of the second storage space, and the calculated magnitude gradient Mag(GSS2) and orientation gradient Ori(GSS2) are stored in the first area and second area, respectively, of the first storage spaces for feature extraction thereof (Block S206).

Up to this point is a process corresponding to the 1st stage as shown in FIG. 3, which is a process of extracting the interest points from the three GSS1, GSS2 and GSS3 images that are adjacent each other.

The SCLoG image that is temporarily copied into the third area of the second storage space is copied into the first area of the first storage space (Block S208) and the SCLoG3 image in the third area of the first storage space is copied into the second area of the first storage space (Block S210).

Further, a GSS4 image is generated from the GSS3 image in the second area of the second storage spaces by applying a Gaussian smoothing and then copied into the third area of the second storage space (Block S212).

The GSS4 image in the third area of the second storage space is subject to the Scale Normalized Laplacian Filtering to generate an SCLoG4 image and the SCLoG4 image is then stored in the third area of the first storage space (Block S214). Further, the SCLoG3 image in the second area of the first storage space is temporarily copied into the third area of the second storage space for the future calculation (Block S216). The SCLoG image is then copied into the third area of the second storage space from the second area of the first storage space (Block S218). A magnitude gradient Mag(GSS3) and an orientation gradient Ori(GSS3) are calculate from the GSS3 image in the first area of the second storage space and the calculated magnitude gradient Mag(GSS3) and orientation gradient Ori(GSS3) are stored in the first and second areas, respectively, of the first storage space (Block S220).

Up to this point is a process corresponding to 2nd stage in FIG. 3.

The SCLoG3 image that is temporarily stored in the third area of the second storage space is copied into the first area of the first storage space (Block S222), the SCLoG4 image in the third area of the first storage spaces is copied into the second area of the first storage space (Block S224), and a GSS5 image is produced from the GSS4 image in the second area of the second storage space by applying the Gaussian smoothing and copied into the third area of the second storage space (Block S226).

The above processes correspond to the 3rd stage in FIG. 3, and a process of preparing a next octave while repeating the 1st stage will be continued.

Through the aforementioned processes, it is possible to reduce the usage of memory required for extracting the detection of interest points and the feature extraction. Further, while maintaining the performance in consideration of the characteristics of the LoG, it is expected to get an efficient detection of interest points and feature extraction.

As mentioned above, according to the one or more embodiments of the present invention, the novel technology Is implemented for the detection of the interest points and features of the images, which is capable of normalizing the image scales in consideration of the response characteristic based on LoG and efficiently allocating storage spaces using three adjacent GSS images.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for extracting features from an image for use in a computing device, the method comprising:
 producing Gaussian Scale Space (GSS) images in the type of a pyramid from the image inputted to the computing device;
 performing a Scale Normalized Laplacian Filtering on the GSS images;
 detecting interest points from the images that are subject to the Scale Normalized Laplacian Filtering; and
 extracting features of the image using the detected interest points,
 wherein the detecting interest points comprises processing three adjacent GSS images using one storage area for GSS images, one storage area for SCLoG (Scale Normalized Laplacian of Gaussian) images, one storage area for gradients, and a plurality of temporary storage areas, and
 wherein the processing three adjacent GSS images includes copying and calculating the GSS images and the SCLoG images into the temporary storage areas.

2. The method of claim 1, wherein said detecting interest points comprises:
 storing adjacent first, second and third GSS images among the GSS images in a first storage space;
 copying the second GSS image and the third GSS image into a second storage space;
 producing first, second and third SCLOG (Scale Normalized Laplacian of Gaussian) images corresponding to the first, second and third GSS images;
 storing the second SCLoG image among the SCLoG images in the second storage space; and
 calculating a first gradient from the second GSS image in the second storage space to store in the first storage space.

3. The method of claim 2, wherein the first gradient comprises a magnitude gradient and an orientation gradient calculated from the second GSS image.

4. The method of claim 2, wherein said detecting interest points further comprises:
 storing the second GSS image and the third GSS image in the first storage space;
 producing a fourth GSS image from the third GSS image to store in the second storage space;

producing a fourth SCLog image from the fourth GSS image to store in the first storage space;

calculating a second gradient from the three GSS image in the second storage space to store in the first storage space.

5. The method of claim 4, wherein the second gradient comprises a magnitude gradient and an orientation gradient calculated from the third GSS image.

6. The method of claim 4, wherein said producing a fourth GSS image from the third GSS image comprises applying a Gaussian Smoothing to the third GSS image.

7. An apparatus for extracting features from an image for use in a computing device, the apparatus comprising:
  means for producing Gaussian Scale Space (GSS) images in the type of a pyramid from the image inputted to the computing device;
  means for performing a Scale Normalized Laplacian Filtering on the GSS images;
  means for detecting interest points from the images that are subjected to the Scale Normalized Laplacian Filtering; and
  means for extracting features of the image using the detected interest points,
  wherein the means for detecting interest points is configured to process three adjacent GSS images using one storage area for GSS images, one storage area for SCLoG (Scale Normalized Laplacian of Gaussian) images, one storage area for gradients, and a plurality of temporary storage areas, by copying and calculating the GSS images and the SCLoG images into the temporary storage areas.

8. The apparatus of claim 7, wherein the means for detecting interest points is further configured to:
  store adjacent first, second and third GSS images among the GSS images in a first storage space;
  copy the second GSS image and the third GSS image into a second storage space;
  produce first, second and third SCLOG (Scale Normalized Laplacian of Gaussian) images corresponding to the first, second and third GSS images;
  store the second SCLoG image among the SCLoG images in the second storage space; and
  calculate a first gradient from the second GSS in the second storage space to store in the first storage space.

9. The apparatus of claim 8, wherein the first gradient comprises a magnitude gradient and an orientation gradient calculated from the second GSS image.

10. The apparatus of claim 8, wherein the means for detecting interest points is further configured to:
  store the second GSS image and the third GSS image in the first storage space;
  produce a fourth GSS image from the third GSS image to store in the second storage space;
  produce a fourth SCLog image from the fourth GSS image to store the first storage space;
  calculate a second gradient from the three GSS image in the second storage space to store in the first storage space.

11. The apparatus of claim 10, wherein the second gradient comprises a magnitude gradient and an orientation gradient calculated from the third GSS image.

12. The apparatus of claim 10, wherein the fourth GSS image is produced by applying a Gaussian Smoothing to the third GSS image.

13. A method for extracting features from an image for use in a computing device, the method comprising:
  producing Gaussian Scale Space (GSS) images in the type of a pyramid from the image inputted to the computing device;
  performing a Scale Normalized Laplacian Filtering on the GSS images;
  detecting interest points from the images that are subject to the Scale Normalized Laplacian Filtering; and
  extracting features of the image using the detected interest points,
  wherein said detecting interest points comprises:
    storing adjacent first, second and third GSS images among the GSS images in a first storage space;
    copying the second GSS image and the third GSS image into a second storage space;
    producing first, second and third SCLOG (Scale Normalized Laplacian of Gaussian) images corresponding to the first, second and third GSS images;
    storing the second SCLoG image among the SCLoG images in the second storage space; and
    calculating a first gradient from the second GSS image in the second storage space to store in the first storage space.

* * * * *